(12) United States Patent
Black

(10) Patent No.: US 8,787,732 B2
(45) Date of Patent: *Jul. 22, 2014

(54) EXPORTING METADATA ASSOCIATED WITH DIGITAL VIDEO

(75) Inventor: David Robert Black, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/227,352

(22) Filed: Sep. 7, 2011

(65) Prior Publication Data

US 2012/0002948 A1 Jan. 5, 2012

Related U.S. Application Data

(62) Division of application No. 10/732,551, filed on Dec. 9, 2003, now Pat. No. 8,041,186.

(51) Int. Cl.
*G11B 27/00* (2006.01)
*H04N 5/93* (2006.01)
*H04N 9/80* (2006.01)

(52) U.S. Cl.
USPC ........... 386/278; 386/239; 386/240; 386/247; 386/248; 386/286; 386/287; 386/290

(58) Field of Classification Search
USPC ......... 386/239, 240, 247, 248, 278, 286, 287, 386/290
See application file for complete search history.

(56) References Cited

U.S. PATENT DOCUMENTS

| | | | |
|---|---|---|---|
| 6,034,746 A | 3/2000 | Desai et al. | |
| 6,134,380 A | 10/2000 | Kushizaki | |
| 6,311,194 B1 | 10/2001 | Sheth et al. | |
| 6,324,335 B1 | 11/2001 | Kanda | |
| 6,523,046 B2 | 2/2003 | Liu et al. | |
| 6,542,198 B1 | 4/2003 | Hung et al. | |
| 6,549,922 B1 | 4/2003 | Srivastava et al. | |
| 6,658,056 B1 | 12/2003 | Duruöz et al. | |
| 6,898,799 B1 | 5/2005 | Jarman | |
| 6,959,368 B1 | 10/2005 | St. Pierre et al. | |
| 7,272,843 B1 | 9/2007 | Nejime et al. | |
| 7,383,497 B2 | 6/2008 | Glenner et al. | |
| 7,457,532 B2 | 11/2008 | Barde et al. | |
| 7,505,673 B2 | 3/2009 | Kreiner et al. | |
| 7,580,614 B2 * | 8/2009 | Tsumagari et al. | 386/239 |
| 7,683,940 B2 | 3/2010 | Fleming | |
| 8,041,186 B1 | 10/2011 | Black | |
| 8,296,801 B2 | 10/2012 | Takagi et al. | |
| 2002/0191952 A1 | 12/2002 | Fiore et al. | |
| 2003/0118107 A1 | 6/2003 | Itakura et al. | |
| 2003/0154009 A1 | 8/2003 | Basir et al. | |
| 2004/0057704 A1 | 3/2004 | Katsuo et al. | |
| 2004/0060009 A1 * | 3/2004 | Jung et al. | 715/513 |

(Continued)

OTHER PUBLICATIONS

Portions of prosecution history of U.S. Appl. No. 10/732,551, Sep. 13, 2011, Black, David Robert.

*Primary Examiner* — Daquan Zhao
(74) *Attorney, Agent, or Firm* — Adeli LLP

(57) ABSTRACT

Some embodiments provide a method for processing metadata associated with digital video in a multi-state video computer readable medium. The method specifies a set of rules for propagating the metadata between different states in the video computer readable medium. It then propagates the metadata between the states based on the specified set of rules.

21 Claims, 5 Drawing Sheets

(56) References Cited

U.S. PATENT DOCUMENTS

| | | |
|---|---|---|
| 2004/0064207 A1* | 4/2004 | Zacks et al. .................. 700/91 |
| 2004/0085445 A1 | 5/2004 | Park |
| 2004/0086265 A1 | 5/2004 | Tojo et al. |
| 2004/0257434 A1 | 12/2004 | Davis et al. |
| 2005/0068417 A1 | 3/2005 | Kreiner et al. |
| 2005/0076039 A1 | 4/2005 | Ludwig et al. |
| 2005/0078186 A1* | 4/2005 | Kreiner et al. .............. 348/152 |
| 2006/0242325 A1 | 10/2006 | Ramaswamy et al. |
| 2011/0317978 A1 | 12/2011 | Black |
| 2011/0317985 A1 | 12/2011 | Black |

* cited by examiner

EXPORTING METADATA ASSOCIATED WITH DIGITAL VIDEO

CLAIM OF BENEFIT TO PRIOR APPLICATION

This Application is a divisional application of U.S. patent application Ser. No. 10/732,551, now issued as U.S. Pat. No. 8,041,186, filed Dec. 9, 2003. U.S. patent application Ser. No. 10/732,551, now issued as U.S. Pat. No. 8,041,186, is incorporated herein by reference.

FIELD OF THE INVENTION

The present invention is directed towards propagating metadata associated with digital video.

BACKGROUND OF THE INVENTION

When first designed, the digital video format was truly revolutionary, not only in its treatment of the storage of video/audio media, but also in the transport used to move media between devices. With a digital tape format, timecode was no longer relegated to special purpose control tracks, but carried along with the relevant video and audio data in a cohesive frame based unit. A pure digital connection (e.g., a connection over SDI or FireWire) allows for data to be transferred between devices with no information loss. Beyond simple timecode, extra space is set aside in each frame to carry other types of useful embedded "metadata", including such information as camera configuration/exposure settings, time of day, scene breaks, etc.

In many modern non-linear editors (NLE's), most of this auxiliary information is ignored. Moreover, there does not exist a coherent approach for propagating metadata across different stages of the editing pipeline. Therefore, there is a need in the art for an innovative method for propagating metadata across different stages of a video processing system. Ideally, this method should allow an editor to provide different rules for propagating different types of metadata.

SUMMARY OF THE INVENTION

Some embodiments provide a method for processing metadata associated with digital video in a multi-state video processing system. The method specifies a set of rules for propagating the metadata between different states in the video processing system. It then propagates the metadata between the states based on the specified set of rules.

For instance, in some embodiments, the method exports digital video to a storage. This method initially determines whether a set of metadata of the digital video has an associated set of rules for exporting the set of metadata. If so, it then exports the set of metadata to the storage based on the set of rules.

In some embodiments, the method recaptures digital video from a first storage, when at least a portion of the digital video is also stored in a second storage. The method retrieves the digital video from the first storage. It identifies a set of metadata that is stored for the digital video in the second storage, and then determines whether there is an associated set of rules for processing this set of metadata when the digital video is re-captured from the first storage. If so, the method then stores the set of metadata with the retrieved digital video in a third storage.

In some embodiments, the method displays metadata associated with digital video. The method retrieves a set of metadata associated with the digital video. It then determines whether the set of metadata has an associated set of rules for displaying the set of metadata. If the set of metadata has such a set of associated rules, the method displays the set of metadata according to the set of associated rules.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method that processes metadata associated with video in a multi-state video processing system. This method specifies a set of rules for propagating the metadata between different states in the video processing system. It then propagates the metadata between the states based on the specified set of rules.

For instance, in some embodiments, the method exports digital video to a storage. This method initially determines whether a set of metadata of the digital video has an associated set of rules for exporting the set of metadata. If so, it then exports the set of metadata to the storage based on the set of rules.

In some embodiments, the method recaptures digital video from a first storage, when at least a portion of the digital video is also stored in a second storage. The method retrieves the digital video from the first storage. It identifies a set of metadata that is stored for the digital video in the second storage, and then determines whether there is an associated set of rules for processing this set of metadata when the digital video is re-captured from the first storage. If so, the method then stores the set of metadata with the retrieved digital video in a third storage.

In some embodiments, the method displays metadata associated with digital video. The method retrieves a set of metadata associated with the digital video. It then determines whether the set of metadata has an associated set of rules for displaying the set of metadata. If the set of metadata has such a set of associated rules, the method displays the set of metadata according to the set of associated rules.

The set of associated rules for a set of metadata can include only one rule, or it can include several rules. A metadata set's associated rule set can also include a rule specifying whether all or part of the metadata set should be exported, recaptured, or displayed. The default operation of some embodiments is to propagate a metadata set from one state to another when no set of associated rules exists for propagating the metadata set.

I. Metadata

Figure 1:
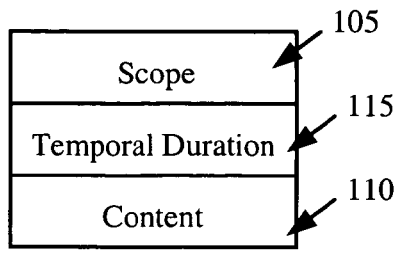
FIG. 1 illustrates the conceptual attributes of a metadata set in some embodiments.

Digital video metadata can include a variety of ancillary data, such as time of day, timecode, camera settings, encoding cadence, film maker's comments, etc. The metadata is specified and stored differently in different embodiments. FIG. 1 illustrates the conceptual attributes of each metadata set in some embodiments. As shown in this figure, each metadata set has a scope 105 that specifies the metadata set's associated portion of digital video. This portion can be an entire file, one or more tracks in the file, or a portion of one or more tracks in the file. The scope can be specified explicitly or implicitly for a metadata set.

As shown in FIG. 1, the metadata set includes metadata content 110, which is the actual metadata in the set. Also, the metadata set includes a temporal duration 115. Different embodiments define the temporal duration differently. For instance, this duration is implicit in some embodiments, while it is explicit in other embodiments.

Figure 2:
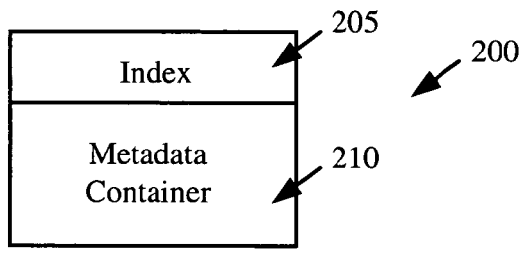
FIG. 2 illustrates one manner for defining a metadata set with an implicit duration in an OS X® environment of Apple Computers, Inc.

FIG. 2 conceptually illustrates one manner for defining a metadata set with an implicit duration in an OS X® environment of Apple Computers, Inc. Specifically, this figure illustrates a user data element 200 that has (1) a 4-character index 205, which is associated with a particular audio/video item (e.g., a/v track or movie), and (2) a metadata container 210 that stores the metadata. The duration of such a data element is implicitly assumed to match the duration of the a/v item associated with the item (i.e., the a/v item associated with the character index 205).

Figure 3:
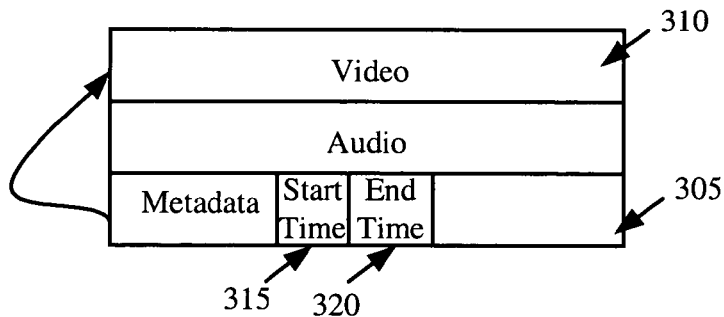
FIG. 3 illustrates one manner for defining a metadata set with an explicit duration in an OS X® environment of Apple Computers, Inc.

FIG. 3 conceptually illustrates one manner for defining a metadata set with an explicit duration in an OS X® environment of Apple Computers, Inc. Specifically, this figure illustrates that some embodiments define a metadata set by defining a metadata track, giving the track specific start and end times, and associating the metadata track with one or more a/v tracks. In FIG. 3, the metadata track is track 305, which has start and end times 315 and 320, and which references a video track 310. In such embodiments, the actual metadata content is stored in the metadata track 305, and the duration of the metadata is derived from the specified start and end times and the sample times.

Figure 4:
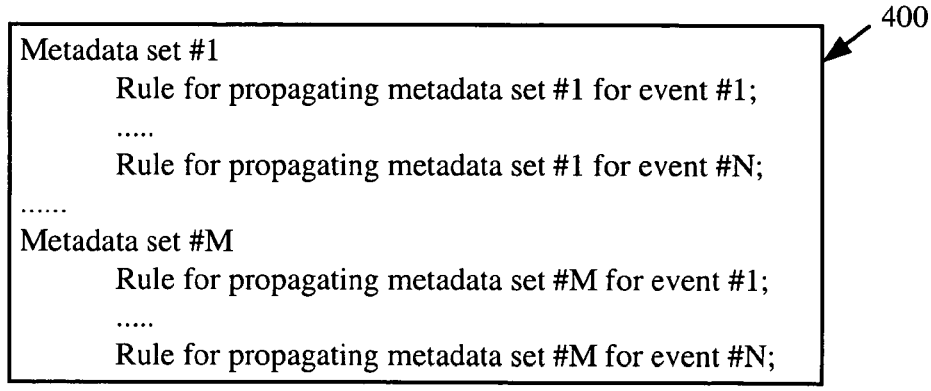
FIG. 4 conceptually illustrates a rule-specifying structure.

Some embodiments organize a metadata set (e.g., organize the metadata content that is stored in the metadata track 305 of FIG. 3 or the metadata container 210 of FIG. 2) in a rule-specifying structure that specifies one or more propagation rules for one or more metadata items in the metadata set. FIG. 4 conceptually illustrates one such rule-specifying structure. As shown in this figure, the rule-specifying structure 400 can specify several propagation rules for several propagation events for a metadata set. In some embodiments, the rule-specifying structure is an XML document that uses XML keys, codes and tags to specify different metadata items and rules for propagating these items.

II. Exporting Metadata

Figure 5:
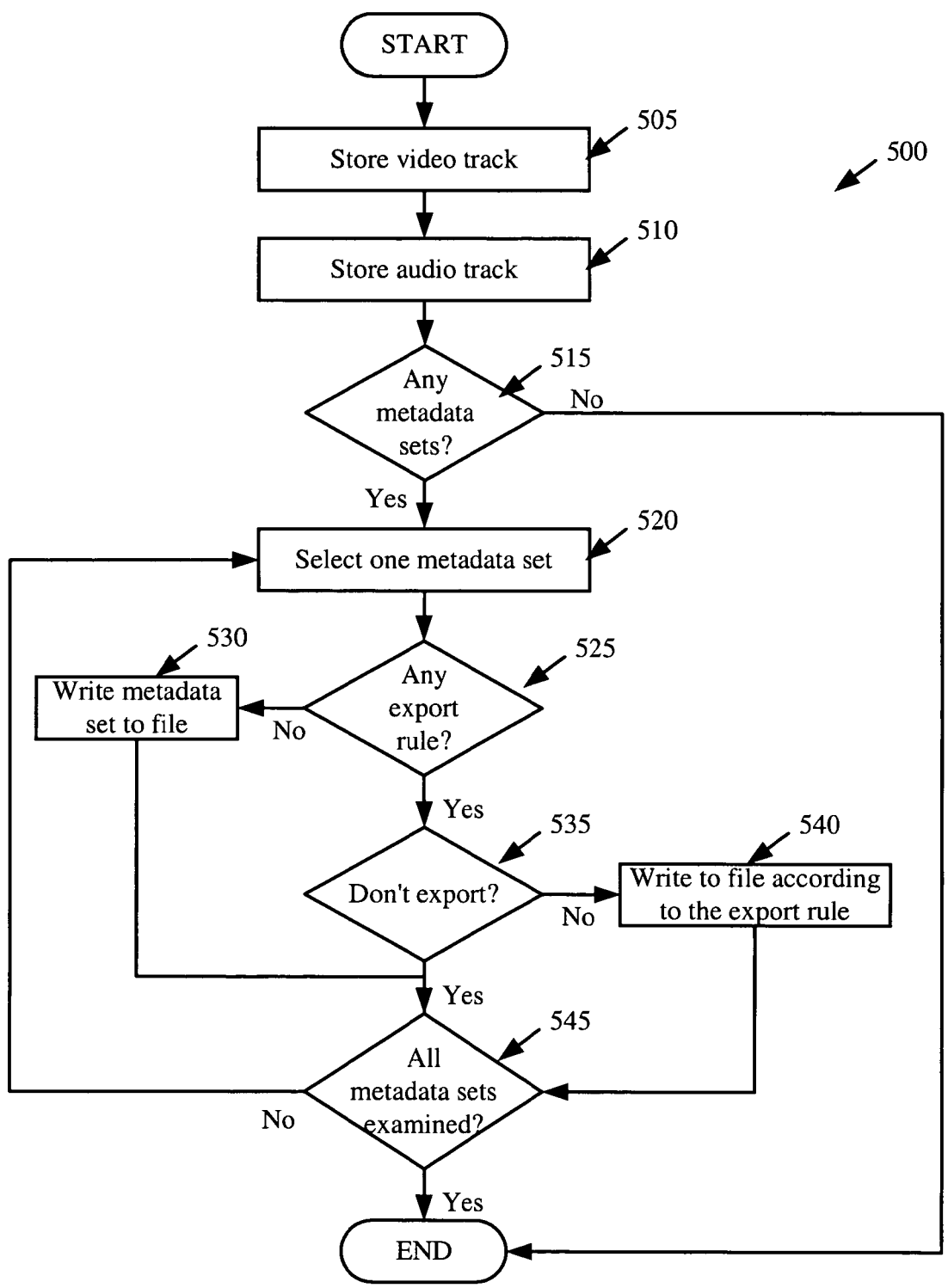
FIG. 5 illustrates a process that some embodiments use to export a digital video presentation from an application database of a video editing application to a file that is stored on a storage.

FIG. 5 illustrates a process 500 that some embodiments use to export a digital video presentation from an application database of a video editing application to a file ("destination file") that is stored on a storage (e.g., a hard drive). This presentation has a video track that is a composite of one or more video tracks and/or special effects. It might also include an audio track that is a composite of one or more audio tracks and/or special effects. It also might include one or more sets of metadata. Each metadata set might include one or more metadata items (i.e., one or more subsets of metadata content). For instance, one metadata set might include the time. This metadata set's individual metadata items might be specified as the time of day, day, month, and year. Another metadata set might be the director's comments, and this set's individual metadata items might be the director's comments for each individual scene in the presentation.

As shown FIG. 5, the process initially stores (at 505) the video track of the presentation in the destination file. It then stores (at 510) the audio track of the presentation in the destination file. The process next determines (at 515) whether there is any metadata set associated with the a/v presentation. If not, the process ends.

Otherwise, the process selects (at 520) a metadata set. It then determines (at 525) whether the metadata set that it just selected at 520 includes any export rules regarding exporting the selected metadata set. If not, the process writes (at 530) the selected metadata set to the destination file, and then transitions to 545, which will be described below. Otherwise, the process determines (at 535) whether the export rule of the selected set prohibits exporting all metadata items in the selected metadata set. If so, the process transitions to 545, which will be described below.

On the other hand, if the export rule specifies that all or part of the metadata set should be exported, the process transitions to 540. At 540, the process writes the selected metadata set to the destination file according to the export rule identified at 525. In other words, at 540, the process writes to file the portion of the selected metadata set that this set's export rule designates for exporting. In some embodiments, the export rule for a metadata set can only specify whether the entire metadata set should be exported or not. Other embodiments, however, allow a metadata set's export rule to specify smaller portions of a metadata set for exporting. After 540, the process transitions to 545.

At 545, the process determines whether it has examined all metadata sets of the a/v presentation. If not, the process returns to 520 to select a metadata set of the presentation that it has not yet examined, and then repeats the above-described operations 525-545 for this selected set. When the process determines that it has examined all the metadata sets of the a/v presentation, it ends.

III. Regenerating Metadata

Figure 6:
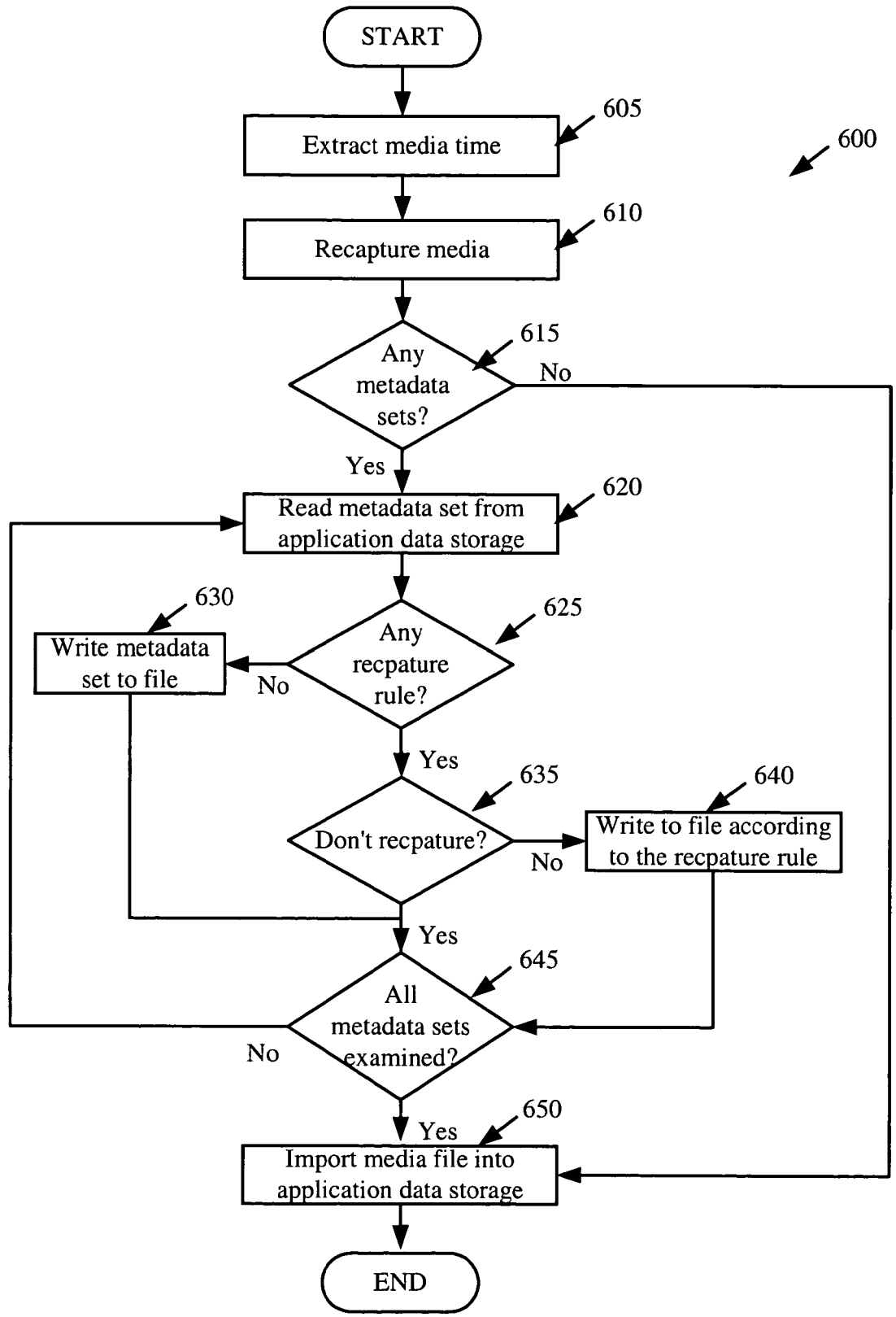
FIG. 6 illustrates a process that some embodiments use during the recapture of the audio or video components of a digital video presentation.

FIG. 6 illustrates a process 600 that some embodiments use during the recapture of the audio or video components of a digital video presentation. This presentation typically includes (1) a video track that is a composite of one or more video tracks and/or special effects, and (2) an audio track that is a composite of one or more audio tracks and/or special effects. It also might include one or more sets of metadata, each of which might include one or more metadata items.

In some embodiments, before the recapture operation, a video editing application's data storage includes some or all of the audio or video components plus metadata associated with these components. In some of these embodiments, the recapture operation imports from a first data storage (e.g., a tape or a file stored on disk) audio or video components of a digital video presentation into the application data storage of the video editing application. This recapture operation might be performed when the original a/v components in the application data storage are corrupted or are incomplete.

As shown FIG. 6, the process initially identifies (at 605) the time period in the a/v presentation for which it needs to recapture a/v data. From the first storage, it then (at 610) recaptures the a/v data within the period identified at 605 and stores the captured data in a media file (e.g., a file on disk). The process next determines (at 615) whether there is any metadata set in the application data storage (e.g., application database) that is associated with the portion of the a/v presentation that the process 600 is recapturing. If not, the process imports (at 650) the media file into the application database, and then ends. Some embodiments import a media file into the application data storage by simply linking the media file to the application data storage.

Otherwise, from the application data storage, the process selects (at 620) a metadata set that is associated with the portion of the a/v presentation that the process 600 is recapturing. It then determines (at 625) whether the metadata set that it just selected at 620 includes any recapture rules regarding processing the selected metadata set during a recapture operation. If not, the process writes (at 630) the selected metadata set to the media file, and then transitions to 645, which will be described below. Otherwise, the process determines (at 635) whether the recapture rule of the selected set prohibits the recapturing of all data in the selected metadata set. If the recapture rule prohibits the recapture of all data in the selected metadata set, the process transitions to 645, which will be described below.

On the other hand, if the recapture rule specifies that all or part of the metadata set should be recaptured, the process transitions to 640. At 640, the process writes the selected metadata set to the media file (that contains the a/v components that were recaptured at 610) according to the recapture rule identified at 625. In other words, at 640, the process writes to the media file the portion of the selected metadata set that this set's recapture rule designates for recapturing. In some embodiments, the recapture rule for a metadata set can only specify whether the entire metadata set should be recaptured or not. Other embodiments, however, allow a metadata set's recapture rule to specify smaller portions of a metadata set for recapturing. After 640, the process transitions to 645.

At 645, the process determines whether it has examined all metadata sets associated with the portion of the a/v presentation that the process 600 is recapturing. If not, the process returns to 620 to select another associated metadata set that it has not yet examined, and then repeats the above-described operations 625-645 for this selected set. The process transitions to 650 when the process determines (at 645) that it has examined all the metadata sets that are associated with the portion of the a/v presentation that the process 600 is recapturing. At 650, the process imports the media file into the application database, as mentioned above. Some embodiments import a media file into the application data storage by simply linking the media file to the application data storage. After 650, the process ends.

IV. Displaying Metadata

Figure 7:
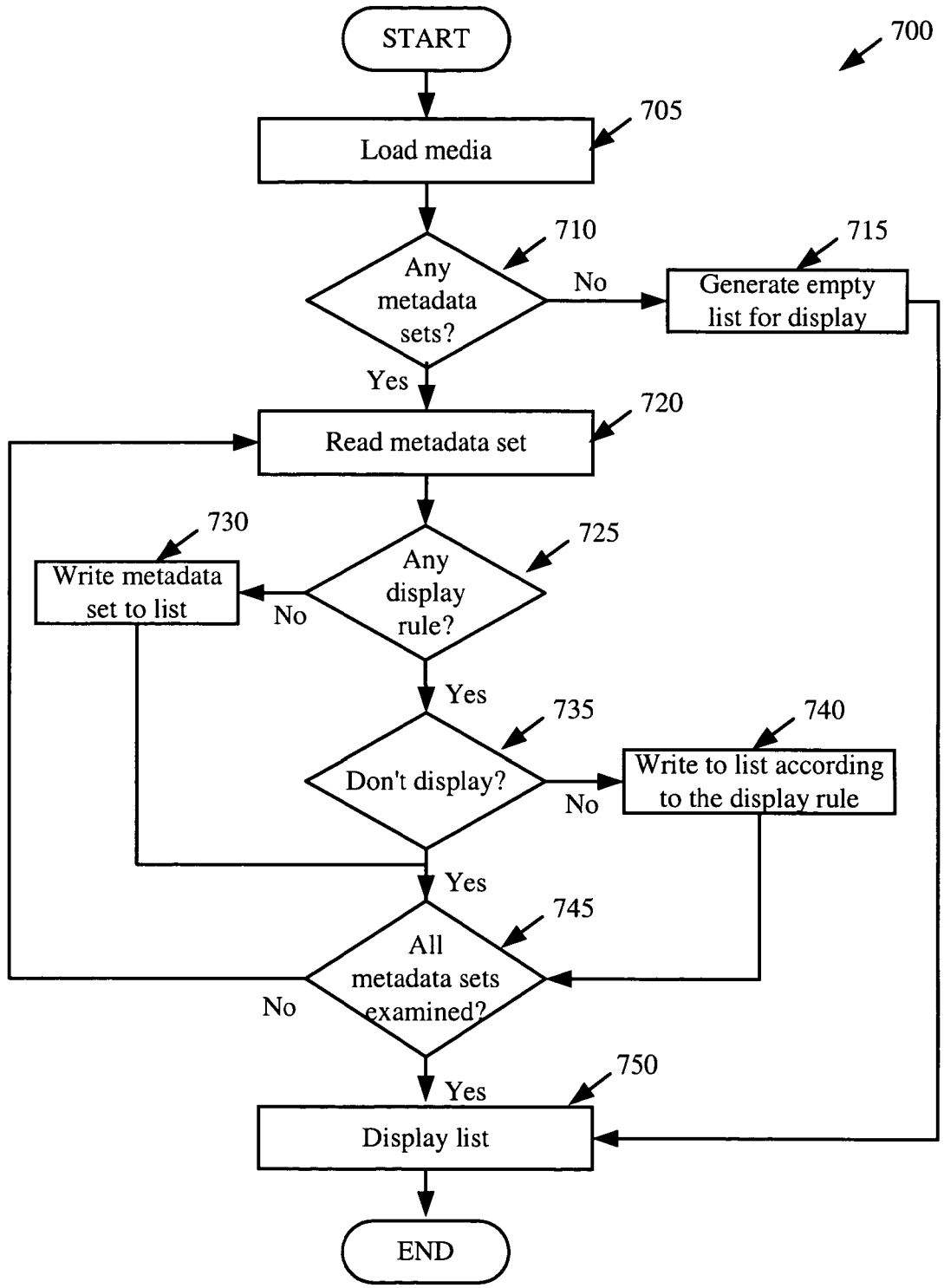
FIG. 7 illustrates a process that some embodiments use to display the metadata associated with a digital video presentation.

FIG. 7 illustrates a process 700 that some embodiments use to display the metadata associated with a digital video presentation. As with exporting and recapturing, the a/v presentation typically includes (1) a video track that is a composite of one or more video tracks and/or special effects, and (2) an audio track that is a composite of one or more audio tracks and/or special effects. It also might include one or more sets of metadata, each of which might include one or more metadata items. The metadata is stored initially in an application data storage along with the a/v presentation.

From the application data storage, the process initially loads (at 705) the a/v presentation for display. In some cases, this loading operation involves a rendering of the audio and video components of the presentation. The process next determines (at 710) whether there is any metadata set associated with the a/v presentation. If not, the process generates (at 715) an empty list for display, and then displays (at 750) this list. This empty list specifies that there is no metadata associated with the a/v presentation for display. After 750, the process ends.

If the process determines (at 710) that there is metadata associated with the a/v presentation, the process selects (at 720) a metadata set. It then determines (at 725) whether the metadata set that it just selected at 720 includes any display rules regarding displaying the selected metadata set. If not, the process writes (at 730) the selected metadata set to the display list, and then transitions to 745, which will be described below. Otherwise, the process determines (at 735) whether the display rule of the selected set prohibits the displaying of all the data in the selected metadata set. If the display rule prohibits the display of all the data in the selected metadata set, the process transitions to 745, which will be described below.

On the other hand, if the display rule specifies that all or part of the metadata set should be displayed, the process transitions to 740. At 740, the process writes the selected metadata set to the display list according to the display rule identified at 725. In other words, at 740, the process writes to the display list the portion of the selected metadata set that this set's display rule designates for displaying. In some embodiments, the display rule for a metadata set can only specify whether the entire metadata set should be displayed or not. Other embodiments, however, allow a metadata set's display rule to specify one or more subsets of a metadata set for display. After 740, the process transitions to 745.

At 745, the process determines whether it has examined all metadata sets of the a/v presentation. If not, the process returns to 720 to select a metadata set of the presentation that it has not yet examined, and then repeats the above-described operations 725-745 for this selected set. When the process determines (at 745) that it has examined all the metadata sets of the digital video presentation, it presents (at 750) the display list, and then ends.

Figure 8:
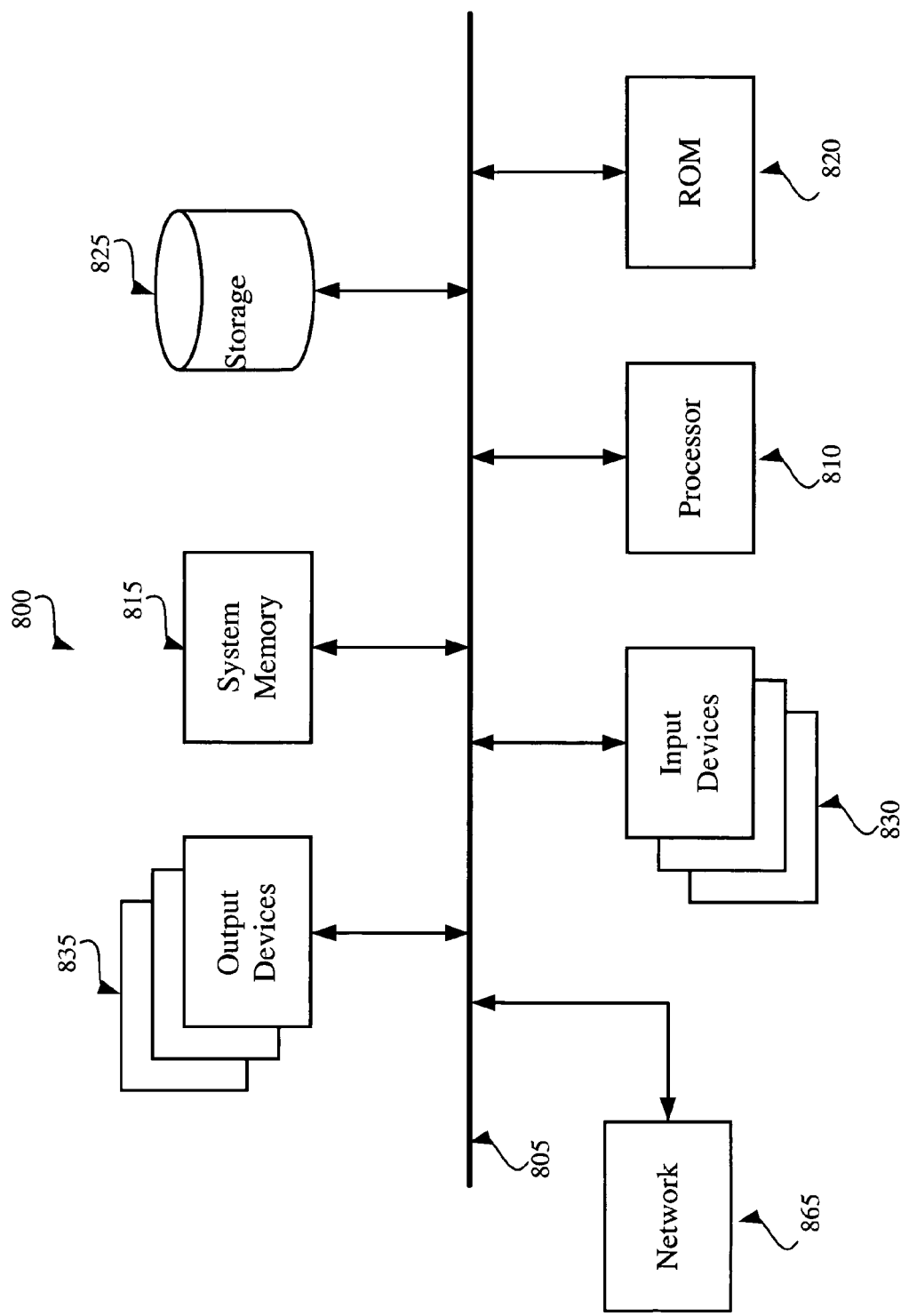
FIG. 8 conceptually illustrates a computer system that can be used to implement some embodiments of the invention.

FIG. 8 conceptually illustrates a computer system 800 that can be used to implement some embodiments of the invention. Computer system 800 includes a bus 805, a processor 810, a system memory 815, a read-only memory 820, a permanent storage device 825, input devices 830, and output devices 835. The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825.

From these various memory units, the processor 810 retrieves instructions to execute and data to process in order to execute the processes of the invention. The read-only-memory (ROM) 820 stores static data and instructions that are needed by the processor 810 and other modules of the computer system.

The permanent storage device 825, on the other hand, is read-and-write memory device. This device is a non-volatile memory unit that stores instruction and data even when the computer system 800 is off. Some embodiments of the invention use a mass-storage device (such as a magnetic or optical disk and its corresponding disk drive) as the permanent storage device 825.

Other embodiments use a removable storage device (such as a floppy disk or zip® disk, and its corresponding disk drive)

as the permanent storage device. Like the permanent storage device 825, the system memory 815 is a read-and-write memory device. However, unlike storage device 825, the system memory is a volatile read-and-write memory, such as a random access memory. The system memory stores some of the instructions and data that the processor needs at runtime. In some embodiments, the invention's processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keyboards and cursor-controllers. The output devices 835 display images generated by the computer system. For instance, these devices display IC design layouts. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet) or a network of networks (such as the Internet). Any or all of the components of computer system 800 may be used in conjunction with the invention. However, one of ordinary skill in the art would appreciate that any other system configuration may also be used in conjunction with the present invention.

The invention described above provides a coherent, innovative approach for propagating metadata across different stages of the editing pipeline of a video editing application. This approach allows the editing application to maintain the metadata associated with a digital video presentation, and subsequently use this metadata. By allowing different rules for propagating different types of metadata, the invention provides a robust, flexible mechanism that allows an editor to specify different ways of propagating different metadata across different stages of the editing pipeline.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A non-transitory computer readable medium storing a media-editing application which when executed by at least one processing unit exports metadata associated with a composite presentation, the media-editing application comprising sets of instructions for:
   exporting, from the media-editing application, a composite presentation that was created by the media-editing application, said composite presentation having an associated set of metadata and a set of export rules, wherein the set of metadata has data that describes the composite presentation;
   identifying, based on the set of export rules for the set of metadata, a subset of the associated set of metadata to export with the composite presentation; and
   exporting, from the media-editing application, the identified subset of the metadata set.

2. The non-transitory computer readable medium of claim 1, wherein the set of instructions for exporting the composite presentation comprises a set of instructions for storing a video portion of the composite presentation in a file.

3. The non-transitory computer readable medium of claim 2, wherein the set of instructions for exporting the composite presentation further comprises a set of instructions for storing an audio portion of the composite presentation in the file.

4. The non-transitory computer readable medium of claim 2, wherein the set of instructions for exporting the identified subset of the metadata set comprises a set of instructions for storing the identified subset in the file.

5. The non-transitory computer readable medium of claim 1, wherein the composite presentation is generated from a plurality of different media items.

6. The non-transitory computer readable medium of claim 5, wherein the set of metadata comprises data about capture of a particular one of the different media items.

7. The non-transitory computer readable medium of claim 1, wherein the set of metadata is associated with a particular duration of the composite presentation.

8. For a media-editing application, a method for exporting a media presentation that was created by the media-editing application, the method comprising:
   exporting, from the media-editing application, the media presentation to a destination file, the media presentation having a plurality of associated metadata sets, wherein each particular metadata set has data that describes the media presentation;
   for each particular metadata set, determining a portion of the metadata set to export based on a set of rules for the particular metadata set; and
   exporting, from the media-editing application, the determined portion of each metadata set to the destination file based on the set of rules.

9. The method of claim 8 further comprising editing a plurality of different media items to create the media presentation.

10. The method of claim 9, wherein the media items comprise video items, audio items, and special effects.

11. The method of claim 8, wherein each particular metadata set is associated with a duration of the media presentation.

12. The method of claim 8, wherein the determined portion of at least one metadata set comprises the entire metadata set.

13. The method of claim 8, wherein the determined portion of at least one metadata set comprises none of the metadata set.

14. The method of claim 8, wherein the sets of rules are specified by an editor of the media presentation and stored with their associated metadata sets.

15. The method of claim 8, wherein the sets of rules are stored in an XML structure.

16. The method of claim 8 further comprising determining, for each particular metadata set, whether the particular metadata set has a set of rules before determining the portion of the metadata set to export.

17. A non-transitory computer readable medium storing a media-editing application which when executed by at least one processing unit exports a composite media presentation, the media-editing application comprising sets of instructions for:
   exporting, from the media-editing application, content of the composite media presentation as a single file, the composite media presentation generated by the media-editing application from a plurality of media items;
   for each of a plurality of metadata sets associated with the composite media presentation, identifying a portion of the metadata set to export in the single file, wherein each metadata set has data that describes a corresponding media item of the composite media presentation; and exporting only the identified portion of each metadata set to the single file for the composite media presentation.

18. The non-transitory computer readable medium of claim 17, wherein the set of instructions for exporting content comprises sets of instructions for:
   exporting a video track to the single file; and
   exporting an audio track to the single file.

19. The non-transitory computer readable medium of claim 18, wherein the video track is a composite of a plurality of video items and special effects.

20. The non-transitory computer readable medium of claim 17, wherein a particular metadata set comprises director's comments for a corresponding video item used to generate the composite media presentation.

21. The non-transitory computer readable medium of claim 17, wherein a particular metadata set comprises a time at which a corresponding video item used to generate the composite media presentation was filmed.

* * * * *